United States Patent
von Klenck et al.

[11] 3,890,908
[45] June 24, 1975

[54] METHOD AND APPARATUS FOR PYROLYTICALLY REDUCING WASTE

[75] Inventors: Jürgen von Klenck, Dusseldorf; Erich Michel, Essen; Klaus-Dieter Gerstenäcker, Dusseldorf, all of Germany

[73] Assignee: Mannesmann-AG, Dusseldorf, Germany

[22] Filed: Jan. 25, 1974

[21] Appl. No.: 436,484

[30] Foreign Application Priority Data
Jan. 26, 1973 Germany.............................. 2304369

[52] U.S. Cl.................... 110/8 R; 110/8 E; 201/11; 202/219; 423/210.5
[51] Int. Cl. ............................................. F23g 7/00
[58] Field of Search .......... 110/8 R, 8 C, 8 E, 18 R, 110/18 C, 18 E; 201/11; 202/219; 423/210.5

[56] References Cited
UNITED STATES PATENTS
1,681,808   8/1928   Morgan................................ 201/11
3,592,151   7/1971   Webber................................. 110/8
3,616,768   11/1971  Southwick............................. 110/8
3,697,256   10/1972  Engle................................... 110/8
3,770,419   11/1973  Brown................................. 201/11
3,777,676   12/1973  Lagen................................. 110/8

Primary Examiner—Kenneth W. Sprague
Attorney, Agent, or Firm—Ralf H. Siegemund

[57] ABSTRACT

Waste is pyrolytically treated by causing it to drift and float, up and through a bath of molten metal or glass. The reduction products are taken from the surface level and above the bath for subsequent use. A feeder pipe has a flared end submerged in the bath for introducing the waste in a low level, while receiving waste through a lateral port. The waste while dropping in the pipe is dried and heated, and the resulting gas can be fed back and used as drift assist. The molten metal or glass is heated to maintain the molten state. Heavy residue is collected in and extracted from the bottom of the bath containing vessel.

39 Claims, 3 Drawing Figures

METHOD AND APPARATUS FOR PYROLYTICALLY REDUCING WASTE

BACKGROUND OF THE INVENTION

The present invention relates to a method and apparatus for pyrolytic reduction of industrial refuse, household rubbish or other waste products.

Reduction of waste of all kinds is, generally speaking, quite a difficult task if ecological consequences are to be considered. Some waste products when reduced produce contaminants, and avoiding pollution of the environment presents considerable technical and economical problems.

Aside from just burning waste products in various kinds of furnaces, it is also known to pyrolytically reduce waste products under exclusion of air. The latter method is of particular interest in the case of so-called problem waste which, if just burnt would produce considerable quantities of poisonous gases, but when pyrolytically reduced the amount of gas production is reduced so that decontamination is simplified.

By way of example, househould waste (rubbish, garbage etc.) is for example processed in that it is crushed, ground or the like and fed to an upright vessel which is heated from the outside so as to reduce the waste to coke. The resulting gas is taken from the lower portion of the vessel, cleaned from contaminants, and the clean gas is used (burnt) as fuel to heat the vessel so as to render the pyrolytic waste destruction self-sustaining. The coke is mixed with neutralized sewage slush, possibly dried thereafter and used e.g. as fertilizer.

The ground waste when more or less loosely packed in the furnace is a rather poor conductor of thermal energy so that the operative coking column is quite small in cross-section and through-put is small and slow accordingly.

In accordance with another known method organic components are at first separated from those components whose content in minerals renders them unsuitable for pyrolytic carbonization. Only the organic residue is subsequently pyrolytically treated. This method is rather expensive because of the necessary separation.

In some instances waste products are pyrolytically reduced in a rotating drum, which is being heated from the outside. Not only is coke produced in these cases (as well as useful fuel gas) but a mixture of different tars is produced also which is quite difficult to process further.

DESCRIPTION OF THE INVENTION

It is an object of the present invention to suggest a method and equipment for processing waste products which include a wide variety of components and do not have to be sorted and separated, but can be pyrolytically reduced, under exclusion of air, to obtain noncontaminating and/or useful reaction products.

It is another object of the present invention to treat problem waste or trash of the variety that includes a very high proportion of organic material including plastics and synthetics having for example a significant content in chlorine and sulphur; the waste to be treated may include also regular household rubbish including for example glass. Moreover, the waste to be treated may include unspecified pieces of metal or metallic compounds.

In accordance with the preferred embodiments of the invention it is suggested to reduce the waste products through immediate contact with a molten material serving as carrier for thermal energy at a temperature sufficient to sustain pyrolytic reduction of the waste products. Preferably, the waste products are preheated, continuously charged into a lower zone of a molten bath and moved to the surface thereof. Thus, the waste products drift upwardly in the molten material under buyoncy conditions, possibly but not necessarily with the aid of additional, directionally effective agitation to promote the upward movement of the waste products in the molten substance.

Specifically, the waste product as at least partially decomposing immediately on contact with the molten material produce a local reduction in density in the bath, so that an upflow or upward drift is induced carrying the waste products to the surface of the molten material in the reaction vessel while undergoing reduction and decompositioning in the drifting process.

Gas developed particularly during the feeding process of the waste product is extracted separately and used as fuel gas and/or as additional driving agent for supporting the upward movement of the waste products in the reaction chambers. This way, such gas is cracked additionally and can be used as fuel or otherwise e.g. for reduction of raw iron ore, for steel or the like.

The molten substance may be comprised of molten metal or minerals. One can use here a mixture of metals, preferably however raw iron is used. Molten iron is sufficiently hot to sustain carbonization, cracking and other reducing processes of organic materials, constituting "problem" waste. As mineral melt one can use giass or glasslike material. The molten material must be maintained in the liquidous state through heating. One can use here the gas developed above the molten bath in that such gas is e.g. electrostatically filtered, washed and cooled to serve as fuel gas in a burner for indirect heating. It is, of course, important that the gas is freed from pollutants or potential pollutants before being burnt in that manner, unless the burnt gas fumes are easily cleaned before discharge into the atmosphere; this, however, is rarely the case and completely clean fuel gas is preferred for use in a burner. The fuel gas can be used in the alternative to generate electrical energy for driving an induction heater.

The reaction vessel does not have to be equipped directly with a heater, but a circulation of the molten material can be sustained by means of a heat exchanger disposed outside of the vessel, which is particularly advantageous for agitating the flow of the molten material in the process. An outside heat exchanger may be used in this case for deriving thermal energy from a nuclear reactor, and lead is being used as a molten substance and placed in heat exchange relation with a helium circulation of a helium cooled nuclear reactor.

Some of the waste products may be prone to develop contaminants when pyrolytically treated. Such contaminants may, for example, tend to remain in the bath of molten material. It is therefor advisable to regenerate the bath. For example, materials can be added scorifying particularly such contaminants so that these contaminants are bound into slag scoria that forms and collects on the surface of the molten material and is then extract separately. Alternatively one can feed particular gases into the reaction chamber, such as oxygen for reacting with the contaminants, such as sulfur and rendering them harmless.

The invention offers the advantage over the known waste processing methods, that the rapid onset of the pyrolsis results in the production of volatile compositions which are not discharged into the atmosphere but can be removed as dust, condensates, even if not or hardly volatile, sublimates, gases or vapors. This is particularly true with regard to halogen compounds.

On the other hand any carbonized residue is free from contaminants to a substantial degree whereby particularly the sulfur content has been drastically reduced. This in turn permits utilization of the coke as filtermaterial for treating sewage slush, and any subsequent burning of such slush does not require any smoke cleaning equipment. Furthermore it was found that the throughput of this method is quite large.

As far as the equipment is concerned, the waste products may be fed into the melt containing reaction chamber through a vertical pipe. The pipe has a lateral feeder port in its upper end, and a flared lower end is submerged rather deeply into the melt for feeding the waste into the bath. The degree of submergence determines the length of the drift path for the waste during which it undergoes carbonization while in intimate contact with the hot, molten material.

The chamber is defined by an air tight vessel with indirect heating. The vessel and the pipe is provided with suitable inlets and outlets to control the feeding and discharge process under conditions which do not permit discharge of gas. The vessel is constructed to sustain circulation of the molten material, with lateral discharge ports for slag and/or other reduction products, while gas is taken from the upper portion of the vessel as well as from the upper portion of the pipe and passed on for further use, including for example circulation of gas as developed in the feeder pipe into the reactor vessel for cracking that gas while it performs useful work as driving agent propelling the waste products in upward direction in the molten material. Provisions should be made here for injecting such gas into the melt through nozzles arranged around the submerged pipe and oriented to drive the waste products in upward direction.

The heater for the molten material may be disposed right at the vessel; alternatively an outside heat exchanger may tap molten material from the vessel, heat it and return it to the vessel. The heating arrangement in general is preferably constructed to sustain a definite circulation in the vessel with an updraft particularly around the submerged feeder pipe to augment the upward drift of the waste products.

The waste products may contain heavy metals. In this case it is advisable to construct the reaction vessel for collecting these metals at the bottom of the vessel, melt them, and extract them separately.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a reaction vessel 1 containing molten pig iron 2, maintained in the molten state by means of induction heating as provided by a heater 3. The vessel 1 is shown schematically only but is presumed to have a refractory, fire proof lining.

Figure 1:
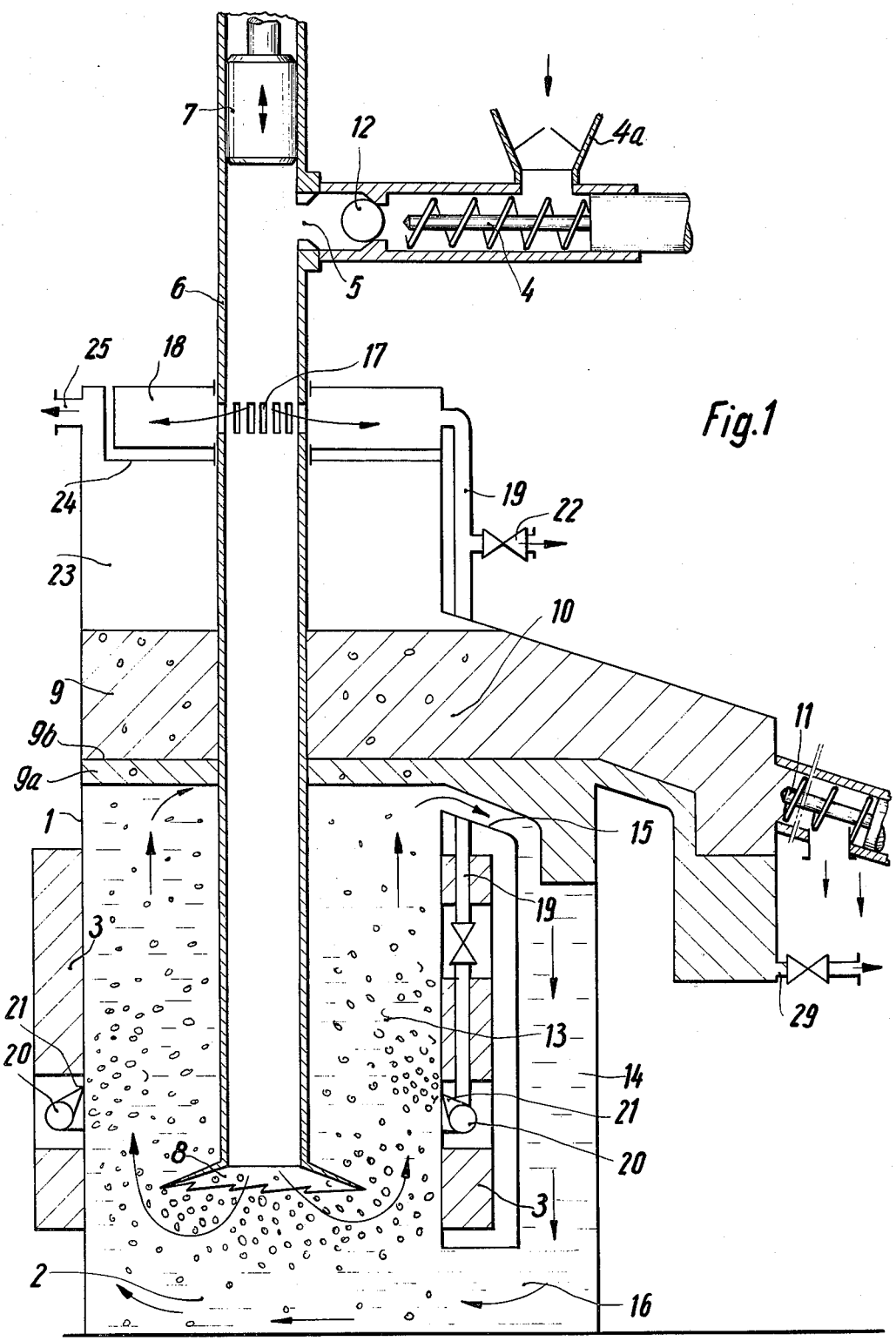
FIG. 1 is a schematic section view of equipment for pyrolytically reducing waste products in accordance with the preferred embodiment of the invention.

Waste products to be pyrolytically reduced (carbonized) ae charged in a hopper 4a; the waste products (rubbish, trash, garbage, industrial refuse etc.) may have been ground to facilitate feeding and are transported by a conveyor worm 4 towards a lateral port 5 of an upright feeder pipe 6. A valve member 12 prevents gases from escaping through feeder port 5.

Feeder pipe 6 leads into vessel 1 in an upright position and has its lower end 8 deeply submerged into the bath of molten iron. A piston or pushing plunger 7 is movably disposed in the upper portion of pipe 6 for pushing down any waste products entering through port 5, for ultimate disposal in the reaction vessel and chamber.

Even though plunger 7 is a discontinuously operating implement, it merely aids in the dropping of the waste in that occasionally particularly wet waste may be impeded in free fall by frictional engagement with the wall of tube 6. However the feeding process is basically a continuous one or can be run on a continuous basis as long as waste is charged into hopper 4a.

Waste products as fed into the pipe 6 in that manner leave the pipe through flared and funnel shaped exit portion 8 with a jagged edge for loosening up the waste product as it may have been compacted to some extent by the plunger 7, particularly when the waste is light but wet.

The lower end of pipe 6 dips deeply into the molten iron as stated. Waste products leaving the pipe through the flared opening 8 can be expected to have a smaller specific weight than iron and will, thus, rise. While floating up, the waste products are pyrolytically reduced to coke. Some gas is formed already near the exit 8 but inside of the lower portion of the pipe and rises therein, more or less surrounding the down pouring waste and drying and preheating it which in turn may be beneficial for the ease of feeding.

Carbonized and slagged decomposition products of the reduced waste collect on the surface of the molten pig iron and establish a surface layer 9. They are discharged from the vessel laterally through opening 10. A screw or worm gear conveyor 11 removes the slag etc. on a continuous basis. The slag and decomposition products may separate to some extent in accordance with their respective specific weight, and heavy products will accumulate in a lower stratum 9a for separate discharge through a valve controlled port 29. Particularly molten iron resulting from sheet metal like waste etc. can be discharged in that manner.

Reference numeral 9b refers to the slag-metal interface, which is not necessarily very pronounced; this depends on the degree of inhomgeneity of the raw waste products and the differences in density of the components thereof. Some preclassification could be considered, but it should be mentioned, that the inventive method and equipment permits separation by means of gravity stratification in a rather simple, built-in manner.

In order to agitate the waste products for upward motion in the molten iron, an extension 14 of the vessel chamber 13 proper is provided for communication near the bottom as well as adjacent to the upper portion of chamber 13. The latter connection is provided particularly by a downward sloping duct 15 or the like, the former connection is established by a bottom near duct 16.

As a consequence, the more intensively heated molten iron in chamber 13 rises therein, leaves through duct 15 and enters chamber 14. Since chamber 14 is somewhat removed from the heater 3, the molten material may cool slightly and drop in chamber 14 for return to chamber 13 via duct 16. The resulting circulatory flow of the iron includes particularly a rising flow branch in chamber 13 carrying along the waste products so that the upward motion of the latter does not depend exclusively or buyoncy.

As state above, the waste products are preheated on their way down from entrance 5 through pipe 6 to exit 8 for drying and partial degassing. The gas that develops here escapes through slots 17 in pipe 6 and flows into a gas chamber 18, air tightly surrounding the exit slots 17. A conduit 19 runs the gas down into an annular duct 20 which circumscribes the vessel 1 in a lower portion thereof.

A plurality of exit nozzles 21 extend from the annular chamber 20 towards the vessel, in a level somewhat above the exit 8 of pipe 6. The nozzles thus extend around pipe 6 and have openings directed radially inwardly as well as upwardly. Exit nozzles 21 from duct 20 pass the gas into the chamber 13, in accordance with their orientation.

The gas is used here as a propellant to further aid in the upward motion of the waste products within the molten iron. Particularly, the gas jets have an upward component which induces or assists upward flow of the molten material carrying the waste products along accordingly. Additionally, the gas so injected undergoes a cracking process in the hot environment in which it rises.

In cases it may be desirable to extract tar from the gas as resulting from (initial) incomplete cracking. This then is the purpose of valve 22 tapping pipe 19 for leading the gas which escaped through slots 17, out of the system for other processing. The bleeder valve 22 can be considered an instrument for control of the gas flow into chamber 13 so that the induced flow of molten material is controlled accordingly.

The gas floating up in bubbles in the molten iron is cracked and to the extent of complete cracking it is collected in the chamber 23 formed between the upper surface of the decomposition product layer 9 and the upper wall or top 24 of the reaction chamber. A discharge exit or port 25 leads to whatever equipment uses that gas. In particular, the gas is cleaned in that dust and gaseous contaminants are removed such as hydrogencloride and/or hydrogen sulfide, water volatile chlorides etc.

The cleaned gas can serve as fuel, for example, for heating the equipment in accordance with the invention, in lieu of or in addition to inductive heating. Alternatively, the cleaned fuel gas may be burnt to generate heat which in turn is used to drive a turbine or the like to generate electric energy, some of which is then used to drive the induction heater 3 as specifically illustrated.

The waste may include sheet metal used for wrapping etc., and the metal may melt in the iron melt with carburization of any by products, particularly of any iron. The carburized iron is somewhat lighter than the raw iron and collects in a layer 9a and can be tapped via the low level slag exit 29, under the valid assumption that it is still heavier than the other carbonized waste products as collected in layer 9. Generally speaking excess iron can be tapped through the discharge path 29.

Equipment constructed in principle as shown in FIG. 1 can be operated in accordance with a second embodiment of the inventive method. The molten material 2 may be glass, but of course one cannot use inductive heating here but a different kind of indirect heating such as a burner using the developed fuel gas directly or the like, can be used. The waste products are treated in basically the same manner in that they are caused to drop in pipe 6, exit at 8 and rise in the reaction chamber under the influence of circulation of the molten gas and gas jet propulsion through nozzle 21.

The mineral content in the waste products adds to the molten glass and runs off through the overflow discharge path 29. One can add slag producing substances in order to control the melting point of the molten material in the reaction chamber.

Figure 2:
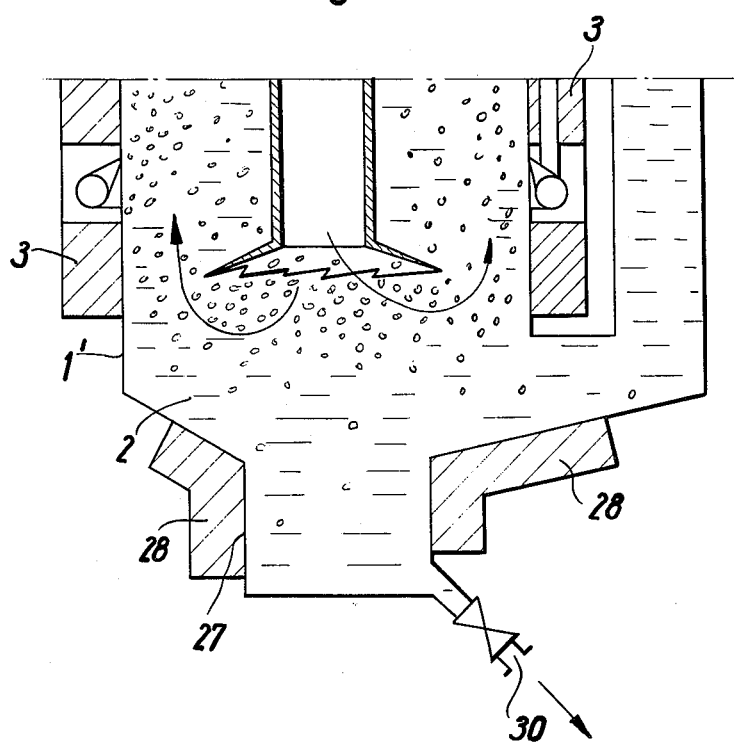
FIG. 2 is a section view through a modified bottom portion of the reactor vessel, shown in FIG. 1 for collecting heavy components of the pyrolytically treated waste products.

Upon using molten glass one has to consider that some metals in the waste products are quite heavy and will not rise, even in the case of upward agitation of the smelt. Under such circumstances it is advisable to use a modified reaction vessel as shown in FIG. 2 but only to the extent needed to explain the modification over FIG. 1. The bottom of the vessel 1' has funnel shaped configuration, not necessarily a symmetrical one, with supplement heating facilities 28 for heating the substance at least up to the melting point of the expected metal to drop. The metal will collect in this bottom portion of the vessel, melt and can be tapped through outlet 30.

Figure 3:
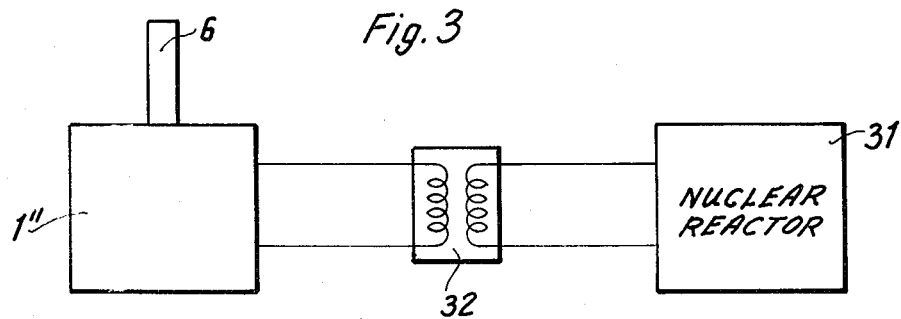
FIG. 3 is a schematic illustration of a pyrolytic apparatus, a heat exchanger and a nuclear reactor for sustaining the pyrolysis.

It should be mentioned, that the heating of the reaction chamber may be provided also through nuclear energy developed in a high temperature nuclear reactor 31 as shown in FIG. 3. Thus, in lieu of heater 3 one can install a gas-metal heat exchanger 32 which is traversed e.g. by liquidous lead, which in turn is heated by a helium circulator deriving its thermal energy from a nuclear reactor. The heated liquidous lead is returned to the vessel 1'' constructed otherwise as shown in FIG. 1 or 2 whereby the lead is used as heating and carbonizing agent for the waste.

The invention is not limited to the embodiments described above but all changes and modifications thereof not constituting departures from the spirit and scope of the invention are intended to be included.

We claim:
1. Method of pyrolytically reducing waste products under exclusion of air comprising the steps of:
feeding the waste products to and deep into a bath of molten material for discharge into the bath well below the top thereof, the waste being composed predominantly of components other than the material, the molten material having elevated temperature sufficient to sustain pyrolytic reduction of waste and under conditions causing the waste products to drift freely upwardly in the molten material thereby pyrolytically decomposing and reducing the waste product, through continuing heat transfer from the molten material to the waste product under direct contact therewith; and extracting the products as resulting from the pyrolytic reduction from above the surface of the bath including continuous discharge of gas developing upon waste decompositioning.

2. Method as in claim 1, comprising, in addition, injecting gas as developed by the pyrolytic decomposition into the bath for aiding in the upward drift of the waste products.

3. Method as in claim 1, wherein the extracting step is carried out in different levels above the surface of the bath, liquidous decompositioning products being discharged from a level above the surface level of the molten material, the gas being discharged from above the surface level of said liquidous products.

4. Method as in claim 1, and including the step of maintaining a circulatory flow in the bath for causing a flow of the molten material in upward direction where the waste products tend to drift in that direction.

5. Method as in claim 1, and including the step of separately collecting the gas developed on initial contact of the waste with the molten material and the gas developed above the surface level of the molten material.

6. Method as in claim 5, including the step of recirculating said separately collected gas and feeding it to the molten substance to obtain cracking thereof.

7. Method as in claim 1, wherein the molten substance is an organic.

8. Method as in claim 7, wherein the molten substance includes at least one metal.

9. Method as in claim 8, wherein the molten substance is molten pig iron.

10. Method as in claim 8, wherein the molten substance is lead.

11. Method as in claim 7, wherein the substance is glass or glass like.

12. Method as in claim 1 and including the step of regenerating continuously the molten substance.

13. Method as in claim 12, wherein regenerating step includes the adding of material for scorifying contaminants in the substance as resulting from the decompositioning of the waste.

14. Method as in claim 12, wherein the regenerating step includes the adding of gases tending to chemically combine with the contaminants to produce compounds which collect on the surface of the molten substance.

15. Method of pyrolytically reducing waste products under exclusion of air comprising the steps of:

continuously introducing and discharging waste products into the interior of a given quantity of molten substance, well below the surface thereof and under exclusion of air, thereby causing the waste products to drift freely through the molten substance in up direction and towards said surface of the molten substance;

maintaining the substance in the molten state through application of heat developed without combustion or burning of any fuel in direct contact with the molten substance but outside of a path of the upward drift of the waste products; and continuously withdrawing the reaction products as resulting from the thermal reduction of the waste products from above the surface level of the molten substance.

16. Method as in claim 15, wherein the withdrawing step includes separate steps respectively for withdrawing gas an non-gaseous reduction products.

17. Method as in claim 16, wherein the withdrawn gas is cleaned and used as fuel in a combustion process for developing the energy for maintaining the molten state of the substance.

18. Method as in claim 15, wherein a circulation of the molten substance is maintained by means of heating the circulating substance and feeding the molten, heated substance for exposing it to the waste material.

19. Method as in claim 15, wherein the maintaining step includes induction heating of the molten substance, the substance being capable of being heated by induction heating.

20. Method as in claim 15, wherein the maintaining step includes utilization of a heat exchanger through which the substance is caused to circulate to pick up thermal energy.

21. Method as in claim 20, wherein the thermal energy is developed in a nuclear reactor.

22. Method as in claim 21, wherein the substance used is lead.

23. Apparatus for pyrolytically reducing waste products comprising:

first means constructed for exclusion of air, for holding a bath of molten material at elevated temperatures sufficient to sustain reduction of waste;

second means projecting into the first means for feeding the waste products to and discharging them deep into a bath of molten material when in the first means through discharge opening well below the surface of the bath and under conditions causing the waste products to drift freely in upward direction in the molten material thereby pyrolytically reducing the waste products through continuing heat transfer from the molten material to the waste product under direct contact therewith;

third means, external to the interior of the first means for continuously heating the bath; and means for extracting the products as resulting from the pyrolytic reduction from above the surface of the bath.

24. Apparatus as in claim 23 and including means for maintaining a circulatory flow in the bath for causing a flow of molten material in upward direction for carrying along the waste material as drifting in that direction.

25. Apparatus as in claim 23, wherein the means for extracting includes exits from the means for holding provided in different levels.

26. Apparatus as in claim 23, wherein the means for holding is a refractory and fire proof vessel, the means for feeding being an upright pipe whose lower end is submerged in the bath.

27. Apparatus as in claim 26, wherein the lower end of the pipe has an outwardly flaring, widened portion, the pipe having a lateral port in its upper portion for feeding waste products in to the pipe, there being means in the port for preventing discharge of gas, the vessel having a lateral outlet with means for extracting the reduction products from the vessel.

28. Apparatus as in claim 27, the pipe having gas discharge openings outside of the vessel, there being a gas collection chamber disposed around the openings and conduit means connected to said chamber.

29. Apparatus as in claim 28, and including means defining nozzles open towards the interior of the vessel below a surface level of the molten material therein, the conduit means connected to the nozzle defining means for causing gas collected in said chamber to be blown into the vessel through the nozzles.

30. Apparatus as in claim 29, and including an annular gas chamber from which extend said nozzle means and extending around said pipe above the lower end thereof, the nozzles directing their respective gas flow in radially inward and upward direction.

31. Apparatus as in claim 27, there being a movable plunger in the pipe to push waste products down.

32. Apparatus as in claim 27, there being a feed worm adjacent said port and a gas lock between the feed worm and the port.

33. Apparatus as in claim 23, wherein the means for extracting includes a first outlet in the surface level of the molten material in the means for holding, and a second outlet above the first outlet for extracting gas.

34. Apparatus as in claim 23, wherein the means for holding is a vessel with a bottom constructed for accumulation of heavy residue as resulting from pyrolytic treatment of the waste product; there being a discharge port for the latter residue in the said bottom.

35. Apparatus for pyrolytically reducing waste comprising:
   means defining a bath of molten material;
   means for introducing waste products and discharging them deep into the bath at a location well below the surface of that bath thereby causing the waste products to drift freely upwardly in the bath;
   means for externally continuously heating the bath;
   means for extracting non-gaseous reduction products from the surface level of the bath; and
   means for removing gas from above the surface level of the bath.

36. Apparatus as in claim 35, the molten material being molten metal.

37. Apparatus as in claim 35, the molten material being molten glass.

38. Apparatus as in claim 35, wherein the means for introducing is a pipe dipping into the molten material and discharging the waste products below the surface level thereof.

39. Apparatus as in claim 38, wherein the pipe has openings for discharge of gas developed by and in the waste as descending in the pipe.

* * * * *